United States Patent [19]

Jones

[11] 3,905,941

[45] Sept. 16, 1975

[54] POLYQUINOXALINES AND METHOD OF PREPARATION

[75] Inventor: Robert J. Jones, Hermosa Beach, Calif.

[73] Assignee: TRW Inc., Redondo Beach, Calif.

[22] Filed: Oct. 31, 1973

[21] Appl. No.: 411,513

[52] U.S. Cl.... 260/47 UA; 117/124 E; 117/161 UN; 161/203; 161/247; 260/30.2; 260/30.8 DS; 260/32.6 N; 260/33.4 P; 260/33.6 UA; 260/49; 260/63 N; 260/79
[51] Int. Cl. .............................................. C08f 5/04
[58] Field of Search.......... 260/47 UA, 49, 63 N, 79

[56] References Cited
UNITED STATES PATENTS

| | | | |
|---|---|---|---|
| 3,642,700 | 2/1972 | Augl | 260/50 |
| 3,654,226 | 4/1972 | Augl et al. | 260/50 |
| 3,661,850 | 5/1972 | Stille | 260/50 |
| 3,746,687 | 7/1973 | Duffy et al. | 260/50 |

*Primary Examiner*—Lester L. Lee
*Attorney, Agent, or Firm*—Daniel T. Anderson; Alan D. Akers; Willie Krawitz

[57] ABSTRACT

Linear polyquinoxalines are produced by the reaction of an aromatic quinoxaline having two furan endcaps or substituents with an aromatic olefinic end-capped monomer. These linear polymers have an alicyclic endooxy linkage repeated throughout the polymer backbone chain where the furan end-cap combines with the olefin end-cap by Diels-Alder reaction. The linear polymer is converted to a higher performance polymer by heating in a range of 200° to 400°C whereupon the endoxy linkage is aromatized in situ. The polyquinoxalines so prepared are suitable for use in severe environments at temperatures up to 350°C.

2 Claims, No Drawings

POLYQUINOXALINES AND METHOD OF PREPARATION

The invention described herein was made in the performance of work under a NASA contract and is subject to the provisions of Section 305 of the National Aeronautics and Space Act of 1958, Public Law 85–568 (72 Stat. 435; 45 U.S.C. 2457).

BACKGROUND OF THE INVENTION

Polyquinoxalines have been prepared by heating slowing a tetramine and a bisglyoxal in an inert atmosphere at about 250°C. The resulting polymer produced by this method is more insoluble than polyquinoxalines produced using other methods.

When a solvent medium is employed, equimolar amounts of bisglyoxal and a tetramine are reacted at elevated temperatures under an inert atmosphere, and the polymer precipitates from solution.

Generally, polyquinoxalines have been synthesized from bisglyoxals which had either a hydrogen or a phenylene radical end-cap. Polyquinoxalines which had the hydrogen radical end-cap on the bisglyoxal generally exhibited less thermal stability but better adhesive properties than polyquinoxalines having the phenylene end-cap on the bisglyoxal.

Polymer solubility at high linear molecular weights presented another problem for the prior art polyquinoxalines. This is particularly true for the polymer solubility of the polyquinoxalines. However, by proper selection of monomers having flexible connecting groups between the aromatic units, solubility of polyquinoxalines below about 400°C is improved over polyquinoxalines synthesized from monomers having a greater proportion of aromatic units.

SUMMARY OF THE INVENTION

High performance polyquinoxalines are produced by the in situ aromatization of polyquinoxalines which have an alicyclic endooxy linkage in the polymer chain. The linear polymer is produced by the reaction of an aromatic difuran end-capped monomer with an aromatic monomer terminated in diolefin. For example, reaction of 2,3-di-α-furylquinoxalines with 1,3-dimaleimidobenzene may be illustrated as follows:

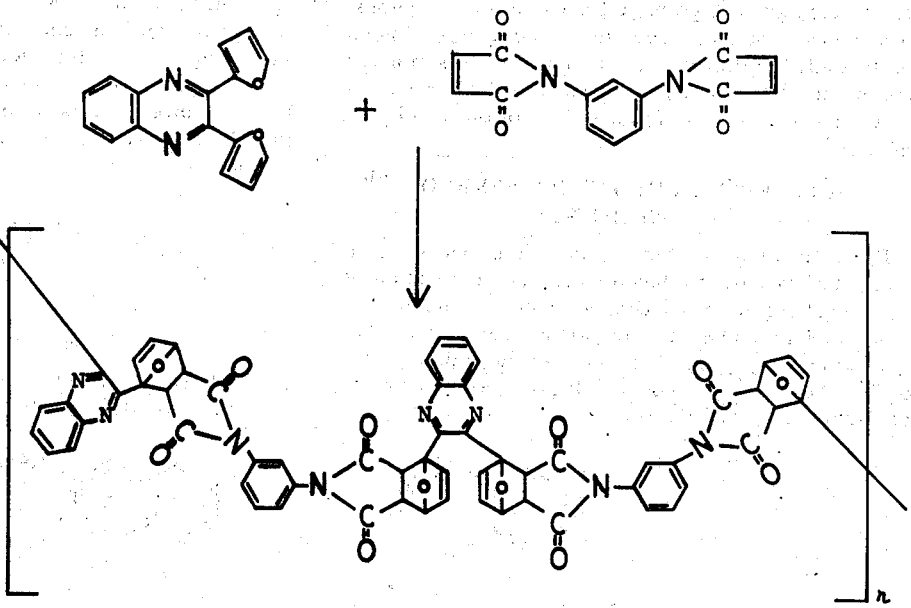

The intermediate linear polymer containing the endooxy bridge provides a structure having a relatively low melting point which permits easier processability prior to final cure by in situ aromatization. Upon subsequent fabrication, the polymer is heated to aromatize the endooxy bridge as follows:

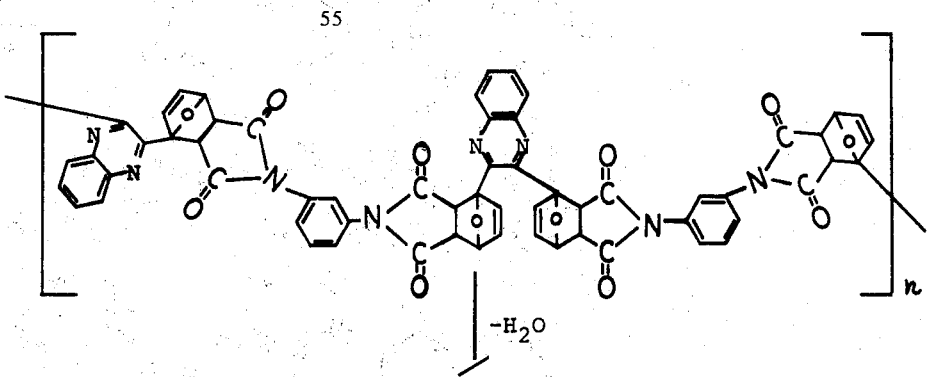

—Continued

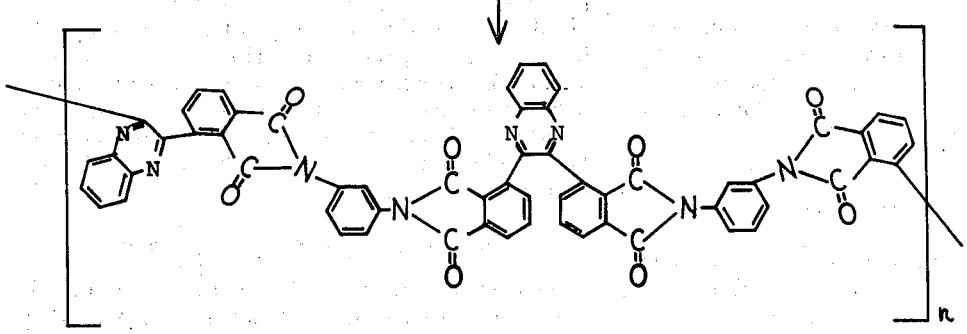

The polyquinoxalines described herein offer an economic advantage over prior quinoxaline resins because of the simplicity of the Diels-Alder synthesis of relatively low cost ingredients. In addition, water, a non-toxic byproduct, is evolved in the aromatization reaction which, under proper fabrication methods, gives a low void content. Articles suitable for use at temperatures up to 350°C in air may be prepared from these resins, e.g., glass or graphite fiber-reinforced composites, adhesive bonded structures, and coatings. Molded parts made by utilizing an autoclave or press-molding technique at temperatures down to 150°C and pressures as low as 15 psi are possible with these polyquinoxalines.

DESCRIPTION OF THE PREFERRED EMBODIMENTS

Polyquinoxalines having outstanding performance characteristics are produced by the polymerization of an aromatic difuran end-capped monomer and an aromatic diolefin end-capped monomer. The reaction between the end-caps produces an alicyclic endooxy linkage in the polymer chain which gives good solubility and fabrication characteristics to the intermediate polymer. Upon fabrication to the final product, heat is applied which results in the in situ aromatization of the alicyclic endooxy linkages and the accompanying loss of water. The resulting aromatized polymer has improved performance characteristics manifested by reduced solubility, improved chemical and thermal stability, and improved physical strength.

The polymerization process is initiated by mixing equimolar amounts of an aromatic quinoxaline monomer having two furan end-caps with an aromatic monomer having two olefin end-caps. The olefin and the furan end-cap groups react at temperatures from 25° to 300°C to produce a polyquinoxaline having recurring alicyclic endooxy linkages according to the following reaction:

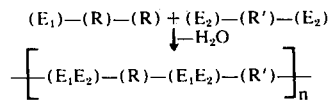

where R is an aromatic quinoxaline radical selected from the following:

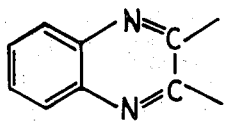 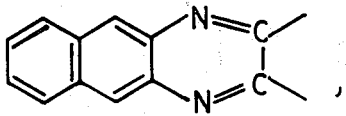

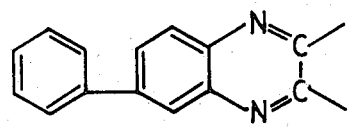 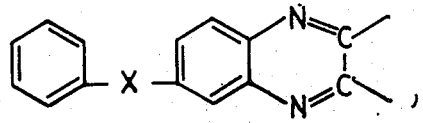

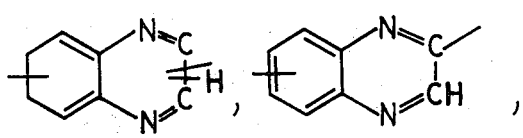 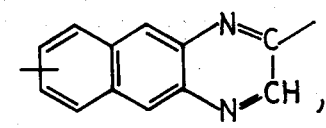

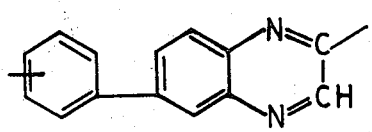 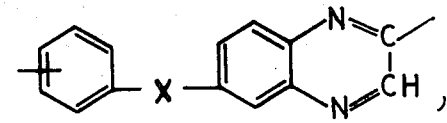

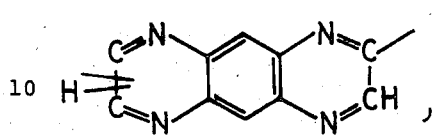 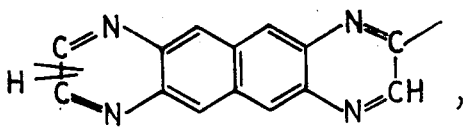

—Continued

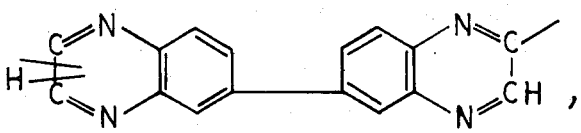

and

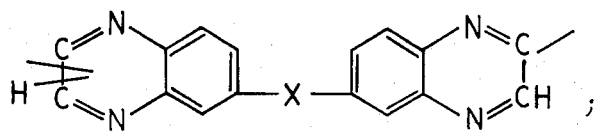

;

where X is —O—, —S—, —CO—, —SO$_2$—, —CH$_2$—, —C$_2$H$_4$—, —C$_3$H$_6$—,

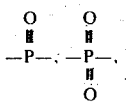

and

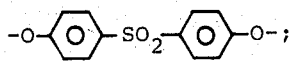

where E$_1$ is a furan radical; E$_2$ can be either a vinyl radical or a maleimido radical; R' is a difunctional aromatic radical which may be selected from the following:

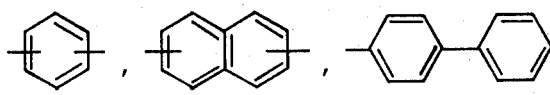

where E$_1$E$_2$ is either

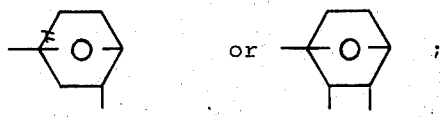

and n is an integer between 4 and 200. After fabrication of the polymer to the final product configuration, the polymer is subjected to a thermal cure cycle which aromatizes the alicyclic endooxy linakge, according to the following reaction:

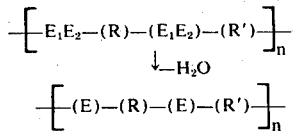

where E$_1$ E$_2$, R, R', and n have been defined previously, and E is

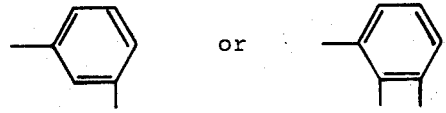

The initial Diels-Alder polymerization reaction may be effected at or near room temperature. However, the preferred temperature range is where the reaction is between 100° to 300°C. In other instance, the polymerization reaction will be completed within 24 to 96 hours. It should be understood that parameters such as viscosity and mass of the reactants will effect the polymerization time, also. The in situ aromatization is normally effected in a temperature range of between 200° and 400°C. The aromatization reaction involves the same mechanism regardless of the constituents between the alicyclic endooxy linkages, and therefore, the time and temperature relationships required remain substantially constant. However, where high molecular weight reactants as contrasted to low molecular weight reactants are used, significantly different times and temperatures of reaction may be expected.

Although it is not critical, solvents may be used to reduce the viscosity of the reactants and facilitate mixing and fabrication. Generally, common solvents can be used, e.g., cresol, dimethylformamide, xylene, pyridine, dimethylsulfoxide or N-methyl-2-pyrrolidine.

Monomers used for the preparation of the polyquinoxalines according to this invention are either commercially available or readily synthesized. Generally, the difuran monomers can be synthesized from either di- or tetramines reacted with or bisglyoxal. Detailed methods for synthesis of 2,3-di-α-furylquinoxaline is available in the *Journal of the American Chemical Society*, Volume 55, pages 1,228 et seq. (1933) reported by Hartman and Dickey.

Generally, the aromatic divinyl or bismaleimido monomers are commercially avilable. However, for the monomers which are not commercially available, methods for synthesis of these compounds are well known and may be obtained from any standard treatise disclosing organic synthesis, e.g., *Organic Synthesis*, Vols. I through V, published by J. Wiley and Sons, New York City, N.Y.

The invention will be more clearly understood by referring to the following examples. These examples illustrate specific embodiments and should not be construed as limiting the invention.

EXAMPLE I

Polymerization of 2,3-di-α-furylquinoxaline and 1,3-dimaleimidobenzene

A mixture of 2.098 g (0.008 mole) of 2,3-di-α-furylquinoxaline and 2.146 g (0.008 mole) of 1,3-dimaleimidobenzene was heated at 232°C (450°F) for 4 hours under a pressure of 200 psig. The resulting polymer was a consolidated plug indicating melt polymerization had occurred. The polymer sample was then postcured employing a cycle consisting of 4 hour linear heat-up from 204° to 315°C followed by isothermal heating at 315°C for 4 hours. The sample obtained from this experimentation was found to be stable to over 350°C by thermogravimetric analysis.

EXAMPLE II

Polymerization of 2,3-di-α-furylquinoxaline and Bis(4-maleimidophenyl) methane

A mixture of 2.098 g (0.008 mole) of 2,3-di-α-furylquinoxaline and 2.86 g (0.008 mole) of bis(4-maleimidophenyl) methane was treated in the same fashion as described in Example I. The sample was stable to 325°C by thermogravimetric analysis.

EXAMPLE III

Polymerization of 2,3-di-α-furylquinoxaline and Bis(4-maleimidophenyl) oxide

A mixture of 2.098 g (0.008 mole) of 2,3-di-α-furylquinoxaline and 2.883 g (0.008 mole) of bis(4-maleimidophenyl) oxide was processed as in Example I to give a solid polymer sample which was found to be stable to 335°C by thermogravimetric analysis.

I claim:

1. A method for making polyquinoxaline polymers comprising:

A. reacting at temperatures ranging from 25° to 300°C, equimolar amount of (i) a difuran end-capped monomer having the formula

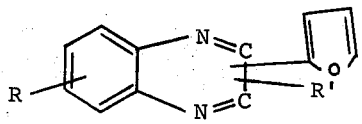

where
R' is a monofunctional radical selected from the group consisting of hydrogen and furan;
when R' is a furan radical, R is selected from the group consisting of

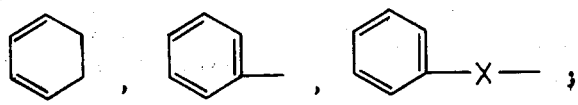

when R' is a hydrogen radical, R is selected from the group consisting of where X is selected from the group consisting of
—O—, —C—, —CO—, —SO$_2$—, —CH$_2$—, —C$_2$H$_4$—,

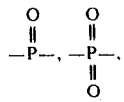

and

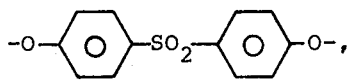

with (ii) an aromatic diolefin having the structure

E—R''—E where R'' is an aromatic difunctional radical selected from the group consisting of

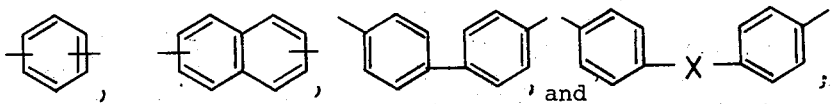

where E is an olefinic radical selected from the group consisting of

—CH=CH$_2$ and

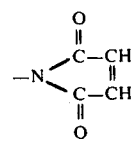

whereby a linear polyquinoxaline is formed having alicyclic endooxy linkages in the linear chain; and B. heating the polyquinoxaline in a temperature range of between 200° to 400°C to convert the alicyclic endooxy linkages to aromatic linkages by in situ aromatization.

2. A polyquinoxaline consisting essentially of the structure:

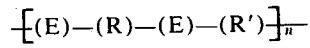

where R is a difunctional aromatic quinoxaline radical selected from the group consisting of

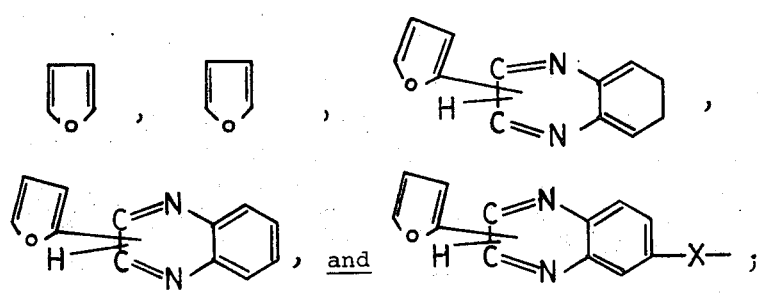

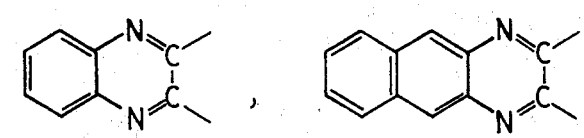
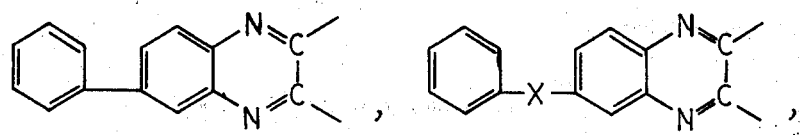
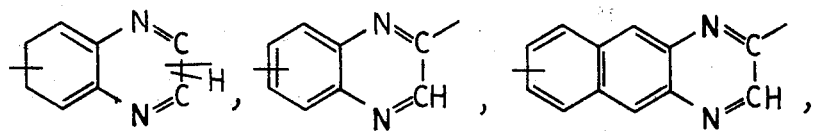
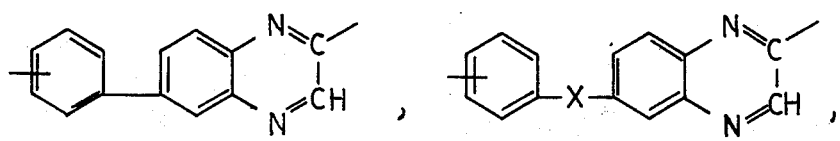
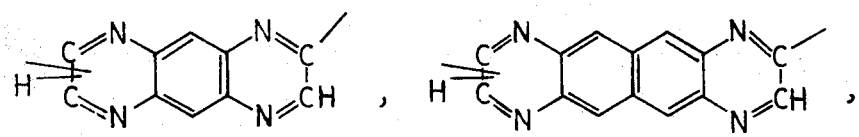
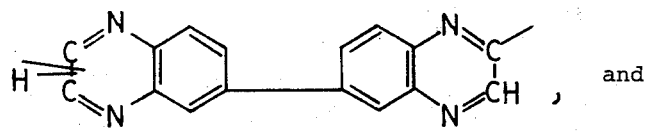
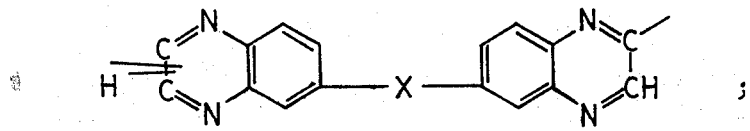
where X is selected from the group consisting of —O—, —S—, —CO—, —SO₂—, —CH₂—, C₂H₄—, —C₃H₆—,
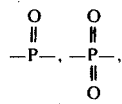
and
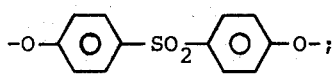
E is selected from the group consisting of
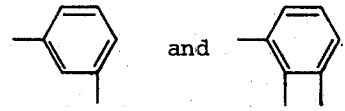
R' is a difunctional aromatic radical selected from the group consisting of
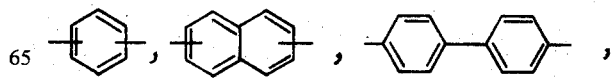

and
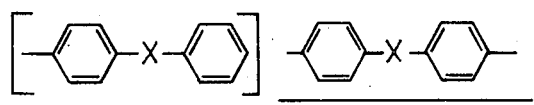
where X is selected from the group consisting of —O—, —S—, —CO—, —SO$_2$—,
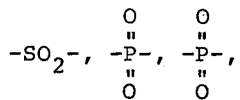
—CH$_2$—, —C$_2$H$_4$—, —C$_3$H$_6$—,
and
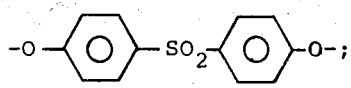
and $n$ is an integer from 4 to 200.
* * * * *